US007895338B2

(12) United States Patent
Leaute et al.

(10) Patent No.: US 7,895,338 B2
(45) Date of Patent: Feb. 22, 2011

(54) META-SEARCH WEB SERVICE-BASED ARCHITECTURE FOR PEER-TO-PEER COLLABORATION AND VOICE-OVER-IP

(75) Inventors: Yves Leaute, Schmitten (DE); Stuart Goose, Princeton, NJ (US)

(73) Assignees: Siemens Corporation, Iselin, NJ (US); Siemens Aktiengesellschaft, Munich (DE)

( * ) Notice: Subject to any disclaimer, the term of this patent is extended or adjusted under 35 U.S.C. 154(b) by 1280 days.

(21) Appl. No.: 10/801,043

(22) Filed: Mar. 15, 2004

(65) Prior Publication Data

US 2004/0260761 A1 Dec. 23, 2004

(51) Int. Cl.
G06F 15/16 (2006.01)
(52) U.S. Cl. ...................... 709/227; 709/228
(58) Field of Classification Search ................ 709/224, 709/227; 370/465
See application file for complete search history.

(56) References Cited

U.S. PATENT DOCUMENTS

| 7,167,920 | B2* | 1/2007 | Traversat et al. | 709/230 |
|---|---|---|---|---|
| 2003/0002521 | A1* | 1/2003 | Traversat et al. | 370/465 |
| 2003/0217140 | A1* | 11/2003 | Burbeck et al. | 709/224 |
| 2004/0006708 | A1* | 1/2004 | Mukherjee et al. | 713/201 |
| 2004/0025669 | A1* | 2/2004 | Hughes et al. | 84/609 |
| 2004/0111515 | A1* | 6/2004 | Manion et al. | 709/227 |
| 2004/0148434 | A1* | 7/2004 | Matsubara et al. | 709/246 |
| 2004/0181517 | A1* | 9/2004 | Jung et al. | 707/3 |

FOREIGN PATENT DOCUMENTS

EP 1 229 442 A 8/2002
WO WO 02091239 A2 11/2002

OTHER PUBLICATIONS

Botros, Sherif, Waterhouse, Steve. "Search in JXTA and Other Distributed Networks". First International Confernece on Peer-to-Peer Computing. Aug. 2001. pp. 1-6.*
XNAP, "XNAP Version History", Nov. 17, 2009, p. 1-24.*
Thaden U., Siberske W., Nejdl W.: "A Semantic Web based Peer-to-Peer Service Regi stry Network" Online Article, 'Online! Feb. 19, 2003, XP00230141.6 Retrieved from the Internet:URL:http://projekte.learninglab.uni—hannover de/pub/bscw. cgi /0/4579> 'retrieved on Oct. 18, 2004! p. 1, right-hand column, line 31-line 38 p. 3, left-hand column, line 1—right-hand column, line 14.

(Continued)

Primary Examiner—Hassan Phillips
Assistant Examiner—Ryan J Jakovac
(74) Attorney, Agent, or Firm—Donal B. Paschburg; F. Chau & Associates, LLC

(57) ABSTRACT

In one aspect of the present invention, a system for discovering potential devices on a peer-to peer (P2P) network is provided. The system includes a seeker device and a plurality of potential devices operatively connected to the P2P network. Each of the plurality of potential devices is associated with one or more identity files. Each of the identity files comprising a plurality of searchable elements. One or more of the plurality of potential end-user devices post their one or more identity files on the P2P network. The seeker device searches the P2P network to discover one or more of the plurality of potential devices based on the one or more identity files of the plurality of the potential devices. The seeker device initiates a collaboration session with the one or more potential devices. The collaboration session may be independent of the P2P network.

23 Claims, 13 Drawing Sheets

OTHER PUBLICATIONS

Lance Olson: ".NET P2P: Writing Peer-to-Peer Networked Apps with the Microsoft .NET Framework" MSDN Magazin, 'Online! Feb. 2001, pp. 1-8, XP002301417 Retrieved from the Internet: URL:http://msdn.microsoft.com/msdnmag/issues/01/02/netpeers/> 'retrieved on p. 3, line 24-line 28 p. 4, line 7-line 33.

Samiani G., Sadhwani D.: "Web Services and Peer-to-Peer Computing" Online Article, 'Online! May 1, 2002, XP002301418 Retrieved from the Internet: URL:http://www.webservicesarchitect.com/content/articles/samtani O5pri nt. asp> 'retrieved on Oct. 4, 2004! All the article.

* cited by examiner

```
<?xml version="1.0" encoding="UTF-8" ?>
<S:Envelope S:encodingStyle="" xmlns:S="http://schemas.xmlsoap.org/soap/envelope/"
    xmlns:XI="http://www.w3.org/2001/XMLSchema-instance" xmlns:XS="http://www.w3.org/2001/XMLSchema"
    xmlns:a="http://www.openuri.org/2002/04/soap/conversation/" xmlns:b="http://www.openuri.org/">
  <S:Header>
    <a:StartHeader>
      <a:conversationID XI:type="XS:string">0F23850090B684A6DB08A1748833AFF5D</a:conversationID>
      <a:callbackLocation XI:type="XS:string">http://129.222.0.111:7001/TESTUI</a:callbackLocation>
    </a:StartHeader>
  </S:Header>
  <S:Body>
    <b:requestServerReport />
  </S:Body>
</S:Envelope>
```

Figure 2(a)

```
<?xml version="1.0" encoding="UTF-8" ?>
<SOAP-ENV:Envelope xmlns:SOAP-ENV="http://schemas.xmlsoap.org/soap/envelope/"
    xmlns:xsd="http://www.w3.org/2001/XMLSchema" xmlns:xsi="http://www.w3.org/2001/XMLSchema-instance">
  <SOAP-ENV:Body>
    <ns:requestServerReportResponse xmlns:ns="http://www.openuri.org/" />
  </SOAP-ENV:Body>
</SOAP-ENV:Envelope>
```

Figure 2(b)

```xml
<?xml version="1.0" encoding="UTF-8" ?>
<SOAP-ENV:Envelope xmlns:SOAP-ENV="http://schemas.xmlsoap.org/soap/envelope/"
xmlns:xsd="http://www.w3.org/2001/XMLSchema" xmlns:xsi="http://www.w3.org/2001/XMLSchema-instance">
    <SOAP-ENV:Body>
        <ns:getServerReportResponse xmlns:ns="http://www.openuri.org/">
            <ns:getServerReportResult>
                <ns:HttpName>vop2p.cluster1.com</ns:HttpName>
                <ns:P2Pnetwork>P2PProtocolXYZ</ns:P2Pnetwork>
                <ns:Port>7788</ns:Port>
                <ns:connectedusers>14255</ns:connectedusers>
                <ns:currentlyON>1</ns:currentlyON>
                <ns:message>welcome on cluster 1</ns:message>
            </ns:getServerReportResult>
        </ns:getServerReportResponse>
    </SOAP-ENV:Body>
</SOAP-ENV:Envelope>
```

Figure 3

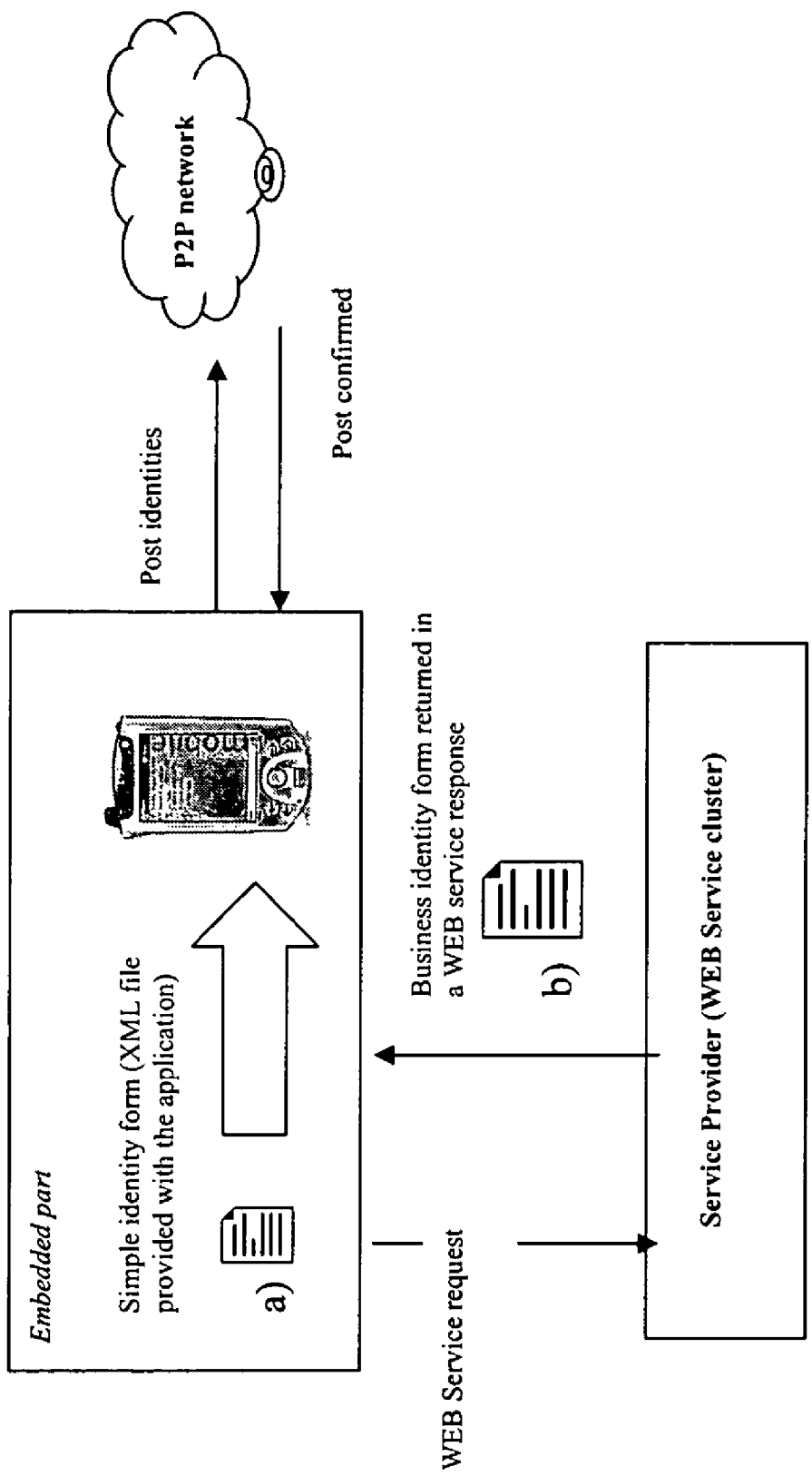

```
<?xml version="1.0"?>
<IdentityForm>
    <br/>
    FirstName:<input type="text" name="cli_firstname" value="John"/>
    <br/>
    LastName:<input type="text" name="cli_lastname" value="Smith"/>
    <br/> Email:<input type="text" name="cli_email" value="Jo.smith@yahoo.com"/>
    <br/> Country:<input type="text" name="cli_country" value="-"/>
    <br/> Gender:<input type="text" name="cli_gender" value="-"/>
</IdentityForm>
```

*LastName:* Smith
*FirstName:* John
*email:* Jo.Smith@yahoo.com
*Country:*
*Gender:*

File saved: <John.Smith.xml>
Saved in P2P shared directory (on his device)

Figure 6(a)

```
<?xml version="1.0"?>
<BusinessIdentityForm>
    <br/>
    Business:<input type="text" name="cli_business" value="Car"/>
    <br/>
    Business2:<input type="text" name="cli_business2" value="Repair"/>
    <br/>
    Type:<input type="text" name="cli_type" value="Mechanics"/>
    <br/> Email:<input type="text" name="cli_email" value="John.smith@aol.com"/>
    <br/> State:<input type="text" name="cli_state" value=" California"/>
    <br/> County:<input type="text" name="cli_country" value="Orange County"/>
    <br/> RegisterID:<input type="text" name="cli_id" value="345222XYZ "/>
</ BusinessIdentityForm >
```

*Business:* Car
*Business2:* Mechanics
*Type:* Repair
*email:* John.Smith@aol.com
*State:* California
*County:* Orange County
*RegisterId;* 345222XYZ File saved: <Car.Mechanics.Repair.xml>
Saved in P2P shared directory
(on his device)

Figure 6(b)

```xml
<?xml version="1.0"?>
<IdentityForm>
    <br/>
    FirstName:<input type="text" name="cli_firstname" value="John"/>
    <br/>
    LastName:<input type="text" name="cli_lastname" value="Smith"/>
    <br/>
    Street:<input type="text" name="cli_street" value=" Sepulveda Avenue 5"/>
    <br/> ZipCode:<input type="text" name="cli_zip" value="92629"/>
    <br/> City:<input type="text" name="cli_city" value=" Dana Point "/>
    <br/> Email:<input type="text" name="cli_email" value="jo.smith@yahoo.com"/>
    <br/>
    Phone:<input type="text" name="cli_phone" value="+1(949)770-6011"/>
    <br/> Services to subscribe:<br/>
    <select name="Services" rows="3" multiple="true">
        <option value="1" selected="true">Free_Phone_Service</option>
        <option value="2" selected="false">Call_Forwarding</option>
        <option value="3" selected="false">Call_Conferencing</option>
        <option value="4" selected="true">Voice_Mail</option>
    </select>
    <br/> Availability:<br/>
    <select name="cli_availability" multiple="true">
        <option value="1" selected="false">Private online</option>
        <option value="2" selected="false">Business on line</option>
    </select>
    <br/> Advertisements:<br/>
    <input type="radio" name="cli_ads" checked="false"/>Advertisements allowed<br/>
    <input type="radio" name="cli_no_ads" checked="false"/>No Ads please<br/>
</IdentityForm>
```

Figure 6(c)

*LastName:* Marie
*FirstName:* Joe
*Street :* -
*City :* Los Angeles
*State :* CA
*Country :* USA
*County :* -
*Gender :* Female
*Business :* Teacher
*Born on :* 17-12-78
*email:* Marie.Joe@hotmail.com

Identity posted by Marie
File saved: <Marie.Joe.xml>
Saved in her P2P shared directory

*LastName:* Marie
*FirstName:* Joe
*City :* Los Angeles
*Country :* USA
*Gender :* Female
*Business :* Teacher
*Born on :*
*email:*

Search criteria entered by John
Information given by John to search for Marie.

Figure 7

META-SEARCH WEB SERVICE-BASED ARCHITECTURE FOR PEER-TO-PEER COLLABORATION AND VOICE-OVER-IP

BACKGROUND OF THE INVENTION

1. Field of the Invention

The present invention relates to the field of networking, and, more particularly, to discovering end-user devices and establishing a collaboration application session between/ among the end-user devices.

2. Description of the Related Art

P2P is a communications model in which two or more parties (or "peers") have the same communications capabilities and any party can initiate a communications session. This differs from other communications models, such as the "client/server" model and the "master/slave" model, in which different nodes may have different communications capabilities. P2P communications may be implemented by giving each communications node both server and client capabilities. In recent years, the term "P2P" has generally come to describe applications in which a group of users can use a network (e.g., the Internet) to directly exchange files through at least one mediating server. In most P2P models, the mediating server is effectively "hidden" from the end-user; thus, the end-user is led to believe that a "direct" connection with another end-user is made.

A P2P network is generally a type of transient network that allows a group of computer users to connect with each other and directly discover and/or transfer files stored in each other's computers (e.g., stored in a hard drive). The P2P network is generally created through the use of P2P networking software such as Kazaa (now commonly called FastTrack), Napster and Gnutella.

The initial growth of P2P networks was primarily due to its ability to directly share multimedia (e.g., music, movies). However, unresolved legal issues associated with the sharing of protected works may reduce the use of P2P networks for such purpose. Therefore, it would be advantageous to use P2P networks in other ways, for example, in gaming and business applications.

SUMMARY OF THE INVENTION

In one aspect of the present invention, a system for discovering potential devices on a peer-to peer (P2P) network is provided. The system includes a seeker device and a plurality of potential devices operatively connected to the P2P network. Each of the plurality of potential devices is associated with one or more identity files. Each of the identity files comprising a plurality of searchable elements. One or more of the plurality of potential end-user devices post their one or more identity files on the P2P network. The seeker device searches the P2P network to discover one or more of the plurality of potential devices based on the one or more identity files of the plurality of the potential devices. The seeker device initiates a collaboration session with the one or more potential devices.

In another aspect of the present invention, a method for a seeker device discovering potential collaborators on a peer-to peer (P2P) network is provided. The method includes the steps of discovering one or more entry point nodes to the P2P network, registering a seeker device on the P2P network, performing identity provisioning on a P2P network, performing one or more searches on the P2P network, obtaining one or more search results for potential collaborators on the P2P network, and initiating at least one of an application and a service to form a collaboration session with one or more potential collaborators from the search results.

In yet another aspect of the present invention, a method for a seeker device discovering potential collaborators on a peer-to peer (P2P) network is provided. The method includes the steps of registering with a P2P network, initiating a Web service to a Web service provider, requesting an available P2P server on the P2P network from the Web service provider using the Web service, registering the available P2P server in a Web service cluster using the Web service, performing identity self-provisioning on the P2P network, obtaining one or more search results searching for a potential collaborator on the P2P network, obtaining service and identity availability for each search result, narrowing the number of search results to generate a narrowed result list, and initiating a collaboration session with one or more potential collaborators on the narrowed result list.

BRIEF DESCRIPTION OF THE DRAWINGS

The invention may be understood by reference to the following description taken in conjunction with the accompanying drawings, in which like reference numerals identify like elements, and in which:

FIGS. 2(*a*) and 2(*b*) depicts XML code for an exemplary registration process, in accordance with one illustrative embodiment of the present invention;

FIG. 3 depicts XML code for an exemplary response to a request action, in accordance with one illustrative embodiment of the present invention;

FIG. 4 depicts a process of self-provisioning, in accordance with one illustrative embodiment of the present invention;

FIG. 5(*b*) depicts an alternate exemplary process for a Web service based remote query of P2P devices, in accordance with one illustrative embodiment of the present invention;

FIG. 5(*c*) depicts an exemplary process for a Web service based remote query of call center agents, in accordance with one illustrative embodiment of the present invention;

FIG. 6(*a*) depicts XML code of an exemplary search form, in accordance with one illustrative embodiment of the present invention;

FIG. 6(*b*) depicts XML code of another exemplary search form, in accordance with one illustrative embodiment of the present invention;

FIG. 6(*c*) depicts XML code of yet another exemplary search form, in accordance with one illustrative embodiment of the present invention;

FIG. 7 depicts an exemplary identity and an exemplary search form with search criteria, in accordance with one illustrative embodiment of the present invention.

DETAILED DESCRIPTION OF PREFERRED EMBODIMENTS

Figure 1A:
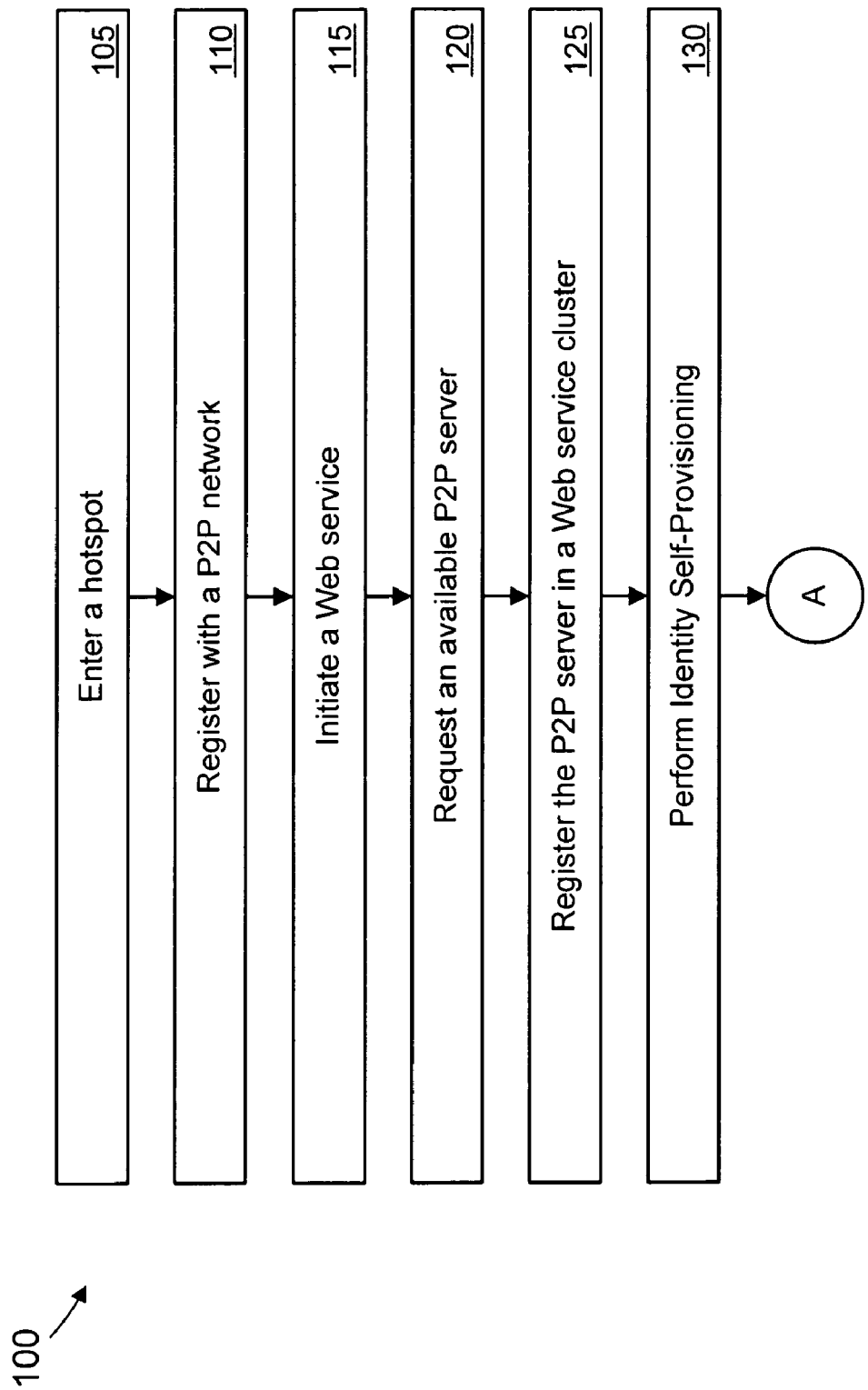
FIG. 1 depicts a flow diagram of a method for a seeker device discovering potential collaborators on a peer-to peer (P2P) network, in accordance with one embodiment of the present invention.

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It is to be understood that the systems and methods described herein may be implemented in various forms of hardware, software, firmware, special purpose processors, or a combination thereof. In particular, at least a portion of the present invention is preferably implemented as an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces. It is to be further understood that, because some of the constituent system components and process steps depicted in the accompanying Figures are preferably implemented in software, the connections between system modules (or the logic flow of method steps) may differ depending upon the manner in which the present invention is programmed. Given the teachers herein, one of ordinary skill in the related art will be able to contemplate these and similar implementations of the present invention.

The present invention allows a collaboration seeker to locate and query potential collaborators in a public (e.g., in an Airport-lounge, coffee shop) or in a private/fixed wireline or wireless home environment (e.g., using ADSL broadband fixed or wireless LAN DSL access routers).

The present invention leverages peer-to-peer ("P2P") networks created by one of a variety of known P2P networking applications/software (e.g., Kazaa, OpenNAP, Gnutella, FastTrack, LimeWire, etc.) such that a collaboration seeker can search for potential collaborators from a collaboration pool. The collaboration seeker may search for the potential collaborators using user-defined search criteria. The term "collaboration pool," as used herein, refers to a group of people, machines, or devices participating in the P2P network. The term "potential collaborators," as used herein, refers to a collaboration pool that has been refined using the user-defined search criteria. Thus, the number of potential collaborators can be no greater than that of the collaboration pool. Once one or more potential collaborators have been identified, the collaboration seeker may establish a collaboration session with the one or more potential collaborators. Collaboration sessions include, but are not limited to, applications and/or services, such as voice-over-IP (VoIP) telephony, multi-player gaming, multi-person business applications, and machine-to-machine applications. Collaboration sessions are usually initiated using a collaboration application. Collaboration sessions generally involve interaction between two or more instances of the same application, or equivalent applications (e.g., VoIP software phones).

Each collaborator in the collaboration pool may be connected to the P2P network using one or more end-user devices. End-user devices may include, but are not limited to, personal digital assistants ("PDAs"), laptop computers with wireless networking capabilities, and mobile phones (e.g., a Smartphone). It is understood that the primary purpose of the P2P network in the present invention is to provide a means by which to identify end-user devices, and, thus, potential collaborators. Once the user has identified one or more potential collaborators from the collaboration pool, the collaboration seeker can obtain the IP address of the one or more potential collaborators and commence a collaboration session.

It should be understood that knowledge of the IP address allows the user to directly contact the potential collaborator with or without use of the P2P networking software. For example, a collaboration session may be made between two or more collaborators over the Internet or a local area network ("LAN").

The present invention can refine and reduce the number of collaborators returned from the collaboration pool by querying the potential collaborators' devices. The collaboration seeker initiates a search based on a search criteria. This may be implemented on, for example, a P2P collaboration application in which the search criteria may be present on a customized search form. If not previously cached, the collaboration seeker can download the search form from, for example, a Web Service Provider ("WSP"). The WSP may be fee-based and separate from an Internet service provider ("ISP"). The P2P collaboration application may automatically search the P2P network and return a result set of potential collaborators.

The majority of the popular existing P2P networks have demonstrated their ability to scale globally and to support significant user populations. In addition, some of these P2P networks are created using widely available open-source software, such as OpenNAP. By utilizing existing P2P network technologies, a number of advantages are automatically inherited. Among these are that the network will be "self-provisioning," which removes a significant burden from the ISP. The term "self-provisioning," as used herein, refers to the ability of an end-user device to be a client-server (i.e., having "servant" capability).

It is understood that the present invention is not limited to any particular type of P2P network or P2P networking software. In one embodiment, a private P2P network (e.g., using an open-source implementation) may be used. In an alternate embodiment, one or more existing public P2P networks may be "piggybacked." In yet another embodiment, a hybrid approach may be used utilizing both a private and public P2P network. Further, there have been various models proposed for P2P networks, such as serverless, super-node server and hierarchical server architectures, each having its respective benefits.

The present invention builds upon the benefits of a P2P network by offering an application/service-independent framework in strong relation with any of a variety of known Web services and Web service architectures ("WSAs"), such as the one defined by the World Wide Web Consortium®. Web services provide a means of interoperating between different software applications, running on a variety of platforms and/or frameworks. This generic approach enables the framework to be used as a vehicle for offering and deploying multiple applications and services—not just a single, dedicated service as with the vast majority of known P2P applications.

The present invention may use a meta-search web service-based architecture. In a meta-search engine, for example, a user submits keywords in a search box. The engine transmits the search to several individual search engines. Results are acquired from all the search engines queried. Meta-search engines generally do not own a database of Web pages. Instead, the engines send search terms to databases maintained by search engine companies.

Figure 1B:
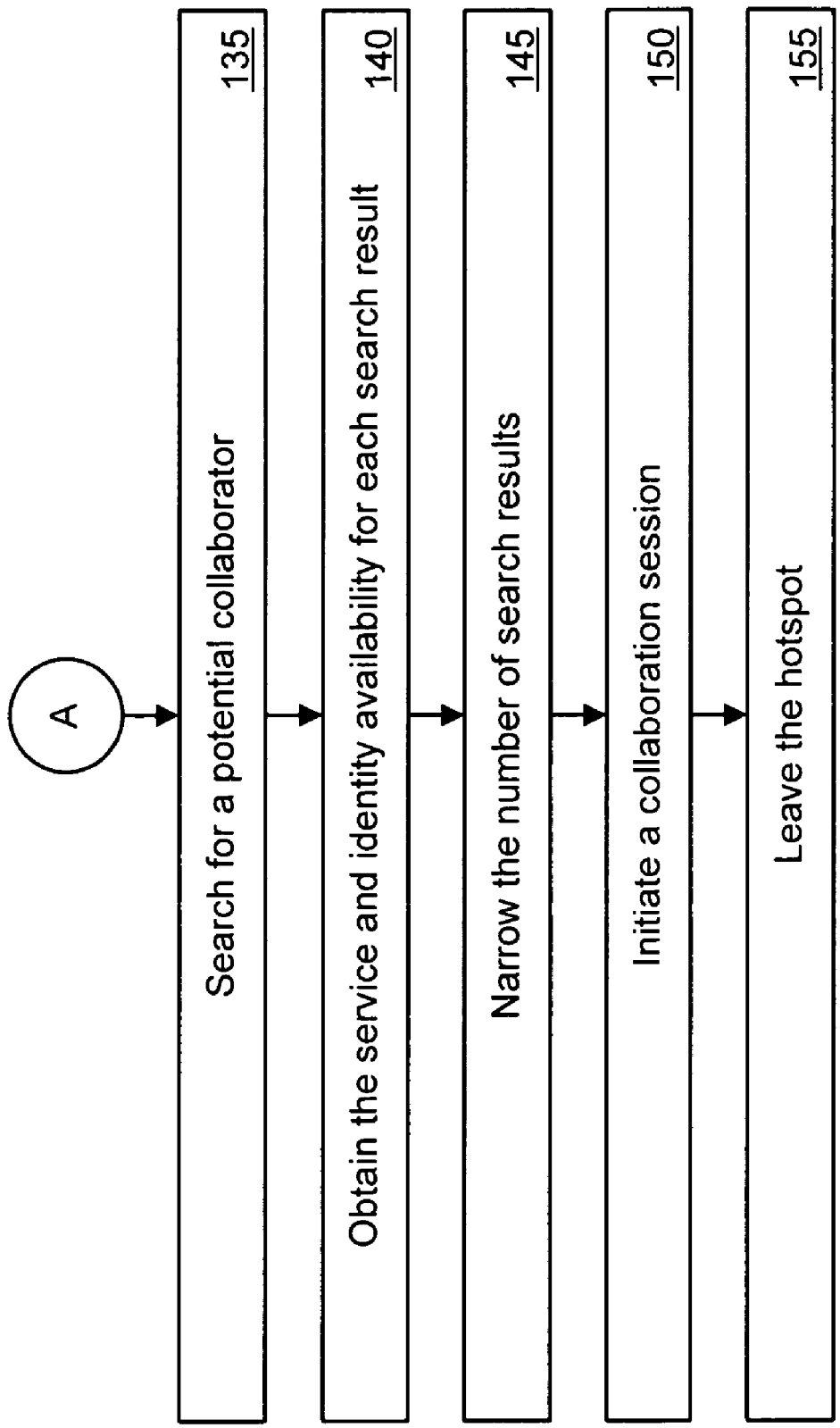

Referring now to FIG. 1, a flow diagram 100 illustrating a method for discovering potential collaborators for a collaboration session on a P2P network is shown, in accordance with one embodiment of the present invention. An end-user device (of the collaboration seeker) enters (at 105) a hotspot area (i.e., a geographic area covered by a wireless network, for example, the Internet), or connects to any IP network using any other means. The end-user device may be any of a variety of portable electronic devices capable of connecting to the hotspot, such as a PDA, a laptop, or a mobile phone.

The end-user device registers (at 110) with a P2P network, which allows the end-user device to utilize the P2P network. This may be done manually by the collaboration seeker or automatically once the end-user device enters (at 105) the hotspot, or connects to any IP network any other means. This registration process may be performed using a Web service and SOAP (Simple Object Access Protocol) protocols over HTTP (HyperText Transfer Protocol), FTP (File Transfer Protocol), etc. over IP (Internet Protocol) networks. For the sake of simplicity, our illustrative embodiments primarily utilize SOAP protocols used over HTTP. However, it should be understood that any of a variety of protocols may be utilized as is contemplated by those skilled in the art. An exemplary registration process is shown in FIGS. 2(a) and 2(b). FIG. 2(a) shows a Web service request by an end-user device to use the P2P network. FIG. 2(b) shows a response by the P2P acknowledging receipt of the Web service request.

Referring again to FIG. 1, the end-user device initiates (at 115) a Web service using HTTP/XML (extensible Markup Language)/SOAP protocols to a known Web service provider ("WSP"). This initiation step may include discovering the WSP. The WSP may be discovered using a UDDI (Universal Description, Discovery and Integration) Web service registry and business entries. It is understood that the discovery of the WSP may be optional (i.e., if knowledge of a particular WSP is hard-coded in the end-user device).

The end-user device requests (at 120) an available P2P server. In one embodiment, the end-user device sends a "request action" using the Web service to the WSP. The Web service may be capable of performing any number of request actions, or receiving any number of responses, actions, or methods. Request actions and responses may be defined in a WSDL service descriptor file. The WSDL service descriptor file is typically published by the WSP into a public UDDI business service registration server. Examples of request actions include "requestServerReport" and "getServerReportResult," as shown in FIGS. 2 and 3, respectively. FIG. 3 illustrates a response by the WSP showing a list a of SOAP service protocol elements reporting an available P2P server, the port to be used, and the number of users connected on the port. This information may be sent to the end-user device using XML/SOAP protocol elements. As shown in FIG. 3, the command "getServerReportResult" returns a list of one or more available P2P network servers. In an alternate embodiment, the command "getServerReportResult" may also return a particular P2P network type (e.g., OpenNap, Kazaa, Gnutella, eMule, Kademlia, or Limewire), including an "entry server" and a P2P access port to be used. The "entry server" is primarily used for registering for the first time on the particular P2P network. As shown in FIG. 3, the end-user device supports only one P2P network (i.e., OpenNap using port 8888). It is understood, however, that the end-user device may support any number of P2P network protocols. It is also understood that the request actions, "requestServerReport" and "getServerReport," are shown only for illustrative purposes, and other command method and functions may be implemented, as is contemplated by those skilled in the art.

Referring again to FIG. 1, the end-user device registers (at 125) the P2P server into the Web service cluster (i.e., a group of two or more computers implementing Web services). The registration process connecting and disconnecting one or more P2P servers into the Web service cluster may be performed using standard middleware architecture platform required to offer Web services, as is known to those skilled in the art. By using any professional J2EE (Java 2 Platform, Enterprise Edition) Web service architecture (e.g., Web-Sphere® from IBM, WebLogic® from BEA, JBOSS), P2P protocols can be used to send statistics and other P2P protocol elements to a J2EE Web service adapter ("J2EE Adapter"). The J2EE Adapter is a composition of a "Connection" and a "Resource Adapter" according to the J2EE Connector Architecture Specifications, JSR112 V1.5. The J2EE Adapter may automatically register a P2P "entry" server as a legacy Enterprise Information System ("EIS") (e.g., IBM® CICS transaction system, SAP/R3 application) on the Web service cluster. This architecture allows key service features, such as (a) load balancing between P2P servers, (b) redundancy, (c) database synchronization, (d) proprietary EIS messaging translation in XML Web services messages, and (e) multiple EIS adapters for each additional supported P2P protocol.

The end-user device performs (at 130) identity self-provisioning. As previously stated, the term "self-provisioning" refers to the ability of the end-user device to be a client-server. The process of "identity self-provisioning" provides an identity of the end-user via the end-user device. The identity may be as simple or enhanced (i.e., complex) as the user or WSP desires. A WSP may provide a simple or enhanced template/ form for entering identity data. In one embodiment, the simple form may be embedded in or automatically downloaded to the end-user device as a default form, and the enhanced forms may be queried and downloaded by the end-user, as he so desires. FIG. 4(a) illustrates the case where an identity form is embedded as part of the end-user device. The collaboration seeker enters data into the identity form. The identity is posted to the P2P network and a post reply is returned. FIG. 4(b) illustrates the alternate case where the end-user device queries the WSP for the identity form. A Web service request is sent to the WSP and the WSP returns the identity form to the end-user device. The end-user enters data into the identity form. The end-user device posts the identity to the P2P network and a post reply is returned.

For security reason, forms completed by the end-user may be checked against a reference template hosted by, for example, the WSP. This avoids incorrectly formatted files and provides a more simplified and secure search process, which is described in greater detail below. Further, it is understood the type and content of information published in the P2P network is entirely up to the end-user. Thus, the end-user may choose to not populate all possible fields in an identity form.

Figure 5A:
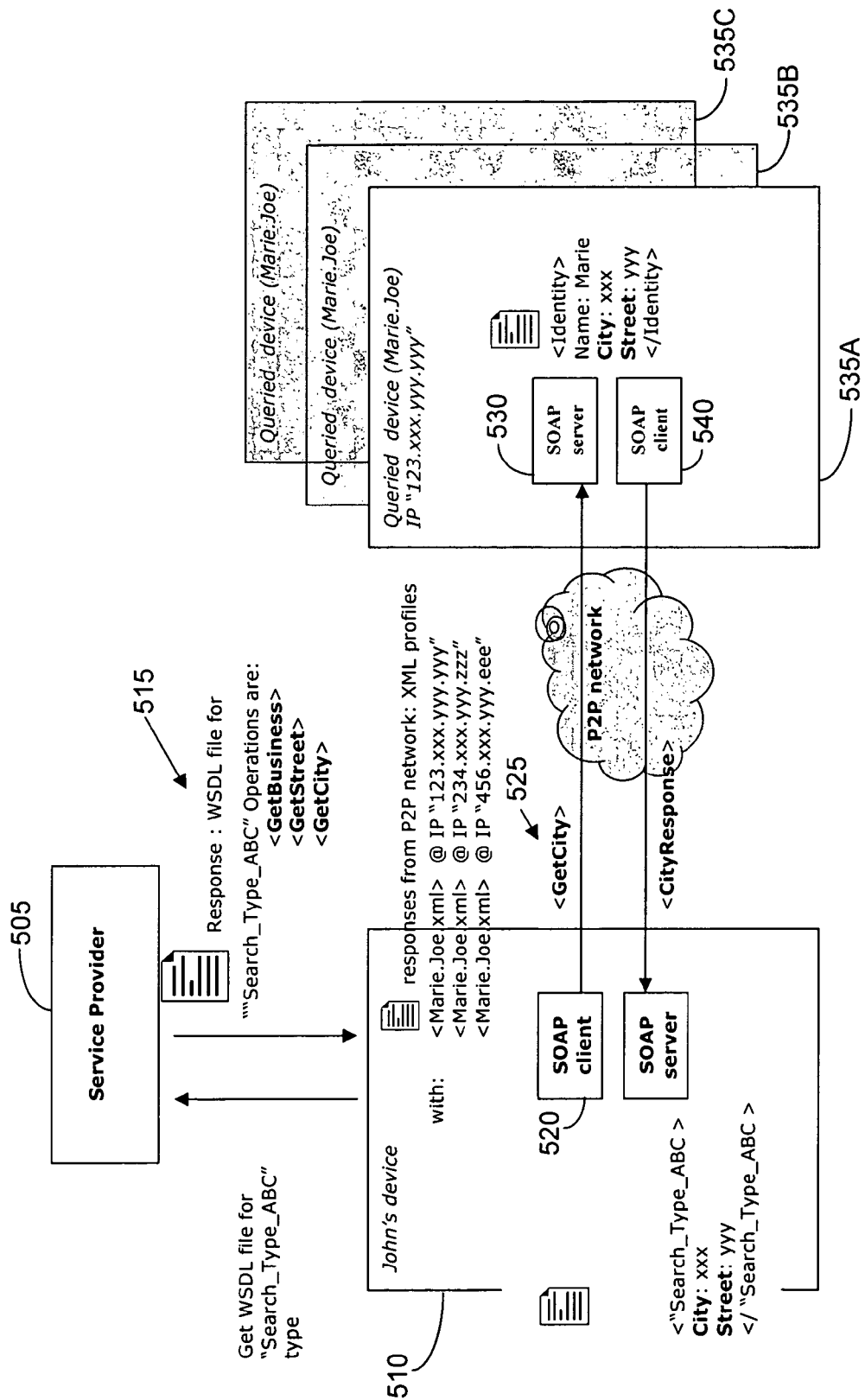
FIG. 5(*a*) depicts an exemplary process for a Web service based remote query of P2P devices, in accordance with one illustrative embodiment of the present invention.

Referring now to FIG. 5(a), a first exemplary search process is shown, in accordance with one embodiment of the present invention. A service provider 505 is responsible for delivering "service descriptors" on-demand to devices which require a particular search. A user device 510 desires from the service provider 505 a way to get access to search information and the associated search process. Therefore, the user device 510 requests a so-called "Web service descriptor file" (hereinafter "WSDL file").

If the service provider 505 has the WSDL file 515 which complies with the request of the user device 510, the WSDL file 515 is transmitted to the user device 510. Based on the transmitted WSDL file 515, a first SOAP client 520 can initiate a search process by transmitting a protocol element <GetCity> in a query 525. The query 525 may not contain any city name. The protocol element <GetCity> is received by a first SOAP server 530 on a queried device 535A. A second SOAP client 540 responds with a protocol element <CityResponse>, which includes the name of the city that was registered on the queried device 535A. The aforementioned query 525 may be performed on other devices, such as 535B and 535C.

Figure 5B:
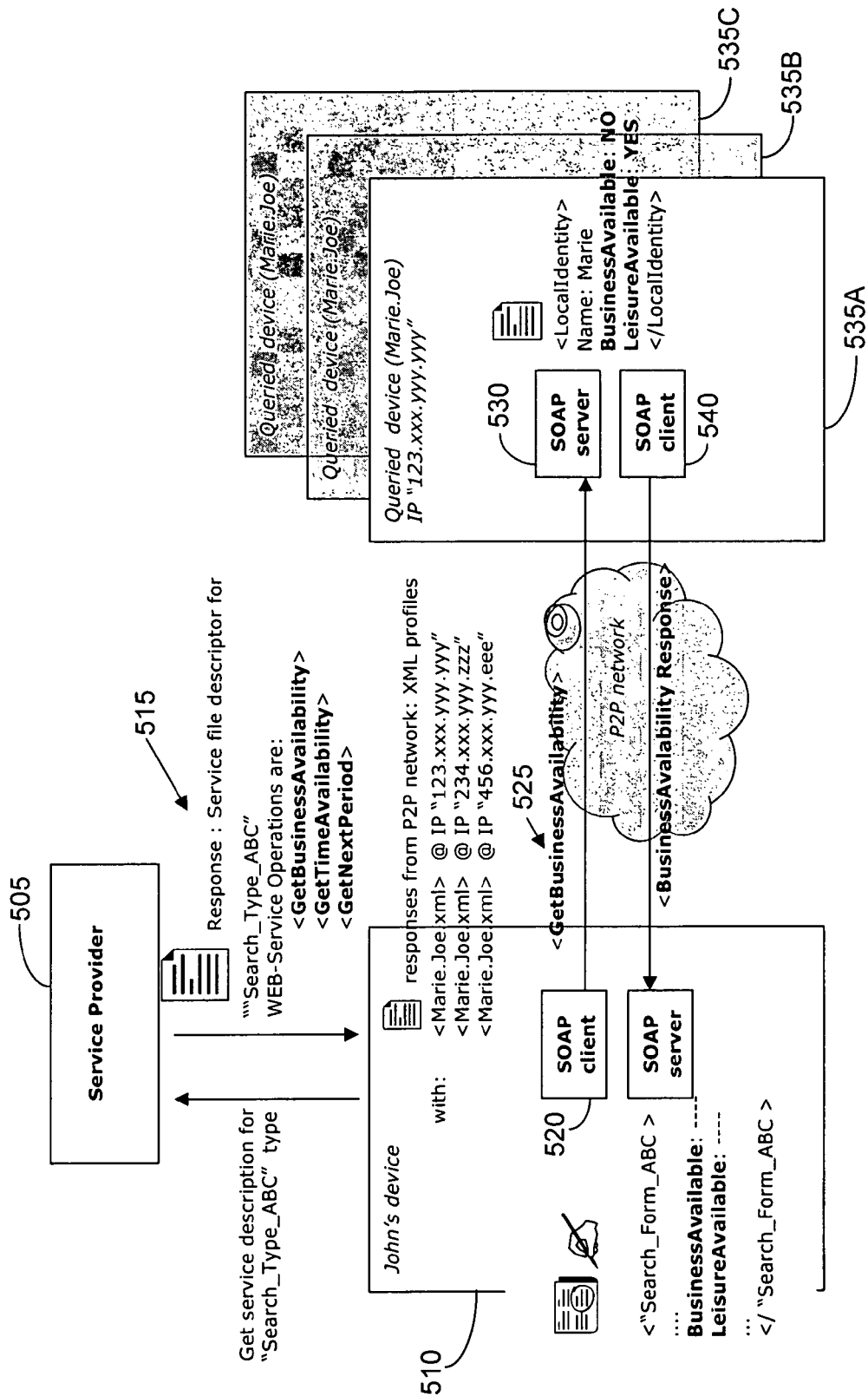

Referring now to FIG. 5(b), a second exemplary search process is shown, in accordance with one embodiment of the present invention. The process of FIG. 5(b) is similar to that of FIG. 5(a), except the requested information in the query 525 is not a city, but a real-time information, such as "business availability" or "leisure availability" of a particular device.

According to a non-predictable/non-deterministic method, the queried device 535A can change the protocol element sent in a real-time fashion. The determination of the "device availability" may be determined by any means, such as local user manipulation or real-time and automatic determination.

Figure 5C:
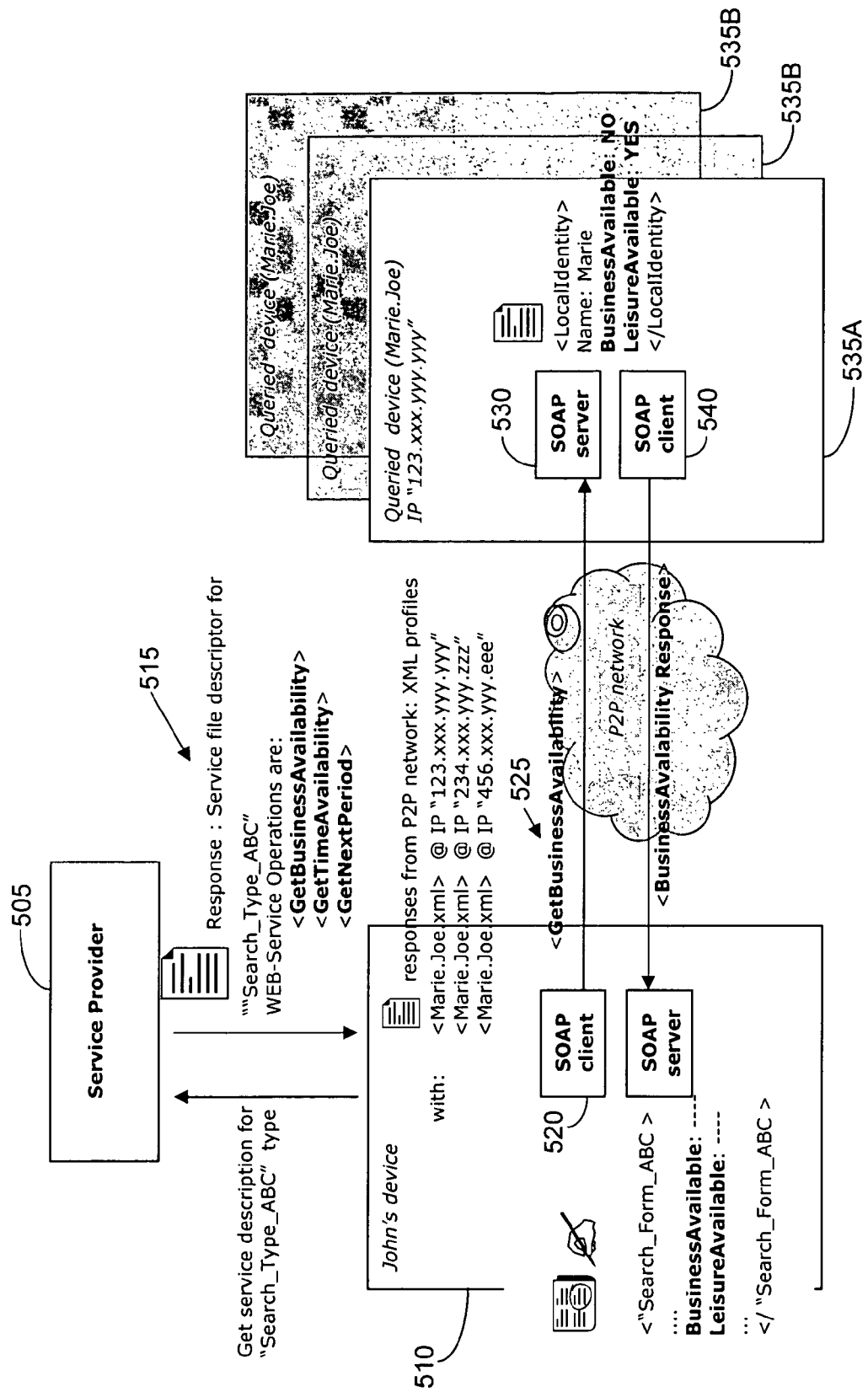

Referring now to FIG. 5(c), a third exemplary search process is shown, in accordance with one embodiment of the present invention. The process of FIG. 5(c) is similar to that of FIG. 5(b), except that FIG. 5(c) is applied to an unknown end-user (e.g., here a call center agent) 535A. In the case, the transmitted protocol element refers, in real-time, to whether a call agent 535A who is "on duty" is able to respond to a call request. In this example, the call agent 535A may respond that it is "on duty" and has certain "skills" registered on it. However, the transmitted protocol element may be repeated by other systems or processes that may not be sent by the end-user itself.

FIG. 6(a) illustrates an exemplary simple personal identity form using XML. The form stores (a) a first name, (b) a last name, (c) an email, (d) a country, and (e) a gender. The file is saved on either (a) a P2P shared directory on the end-user device, or (b) on a distributed Hash Table "stored" on the P2P network itself, such that other users can search for the end user "John Smith" based on the criteria set forth in the identity form.

FIG. 6(b) illustrates an exemplary business identity form for the same user, John Smith, as in FIG. 6(b). The business identity form contains entries for the business type (i.e., a car repair shop), the location of the business, and a registration or license number. The business identity form may be stored in the same P2P directory as the personal identity form.

FIG. 6(c) illustrates an exemplary enhanced identity form. As is illustrated, the enhanced identity provides more information than the simple identity form of FIG. 5(a). It is understood that the identity forms of FIGS. 5(a)-5(c) are shown only for illustrative purposes, and other form types and elements may be used, as is contemplated by those skilled in the art.

Referring again to FIG. 1, the end-user device searches (at 135) for a potential collaborator from the collaboration pool. A simple search process will now be described. It is appreciated that the simple search process is shown only for illustrative purposes, and other search processes may be contemplated by those skilled in the art.

The simple "search process" may comprise at least one of the following two basic phases: (1) a P2P filename search; and (2) P2P file parse. In one embodiment, the search process may be performed using open protocols and international IT standards:

a) by getting a Web service (WSDL file/service descriptor) from a UDDI business service provider;

b) by implementing the Web service on the device according to the WSDL descriptor; and c) by parsing (using SOAP protocols and XML grammar) each of the returned files using Web service descriptors available from step b above.

The P2P file search phase involves narrowing the identity files using the filename. The identity files may also be referred to as "user profiles." As shown in FIG. 5(a), the filename of the simple personality identity form includes the first and last name of the end-user. Thus, a search for a particular end-user named "John Smith" may be performed by searching for the file <John.Smith.xml>. Other information may be searched in the filename as is contemplated by those skilled in the art (e.g., <Car.Mechanics.Repair.xml>).

Referring now to FIG. 7, assume that a collaboration seeker, John, wants to search for a person named "Marie Joe" on the P2P network. The device may initiate a search on the appropriate P2P network for all files published and defined as <Marie.Joe.xml>.

Each queried P2P server may respond with one or more registered <Marie.Joe.xml> files, including each file's respective IP address. It is understood that a response from an end-user device with a file indicates that the end-user device is online in the P2P network.

If more than one file is returned, the end-user would have to check each of the potential partners manually, which can become a tedious and time-consuming process. Thus, it may be advantageous to further perform a P2P file parse. In the example above, the collaboration seeker may input additional search criteria such that the number of <Marie.Joe.xml> files can be narrowed to down to one. The types of additional search criteria (i.e., "masks") may be limited to a search form provided by the WSP or a third party to the collaboration seeker. Any number of masks can be used, including, but not limited to, e-mail address, city, country, gender, street, business, specialty, birthday, business address, etc.

The list above is meant to be only illustrative and not exhaustive. The number and types of masks depends largely on the WSP. The input fields offered on an identity form will generally fit a specific WSP search operation. For example, if the search field "Business" is offered in an identity form, then a querying SOAP action <GetBusiness> may be offered as a possible parsing criteria. Input masks may be standard XML structured files and can be downloaded (or distributed) to end-users devices using Web services protocols and SOAP attachments standards.

Referring again to FIG. 1, the end-user device obtains (at 140) the service or identity availability for each search result, which, in the example above, are "Marie.Joe.xml" files, using SOAP/XML standard protocols on top of HTTP transport protocols. This generally allows the end-user device to query files across network address translators ("NATs") and corporate firewalls, as HTTP is mostly used on Internet port 80 and cannot be blocked unless Internet access is blocked completely. It is understood that many other protocols (or mechanisms using other protocols in combination with HTTP, such as UDP) may be used as is known to those skilled in the art. Many of those are publicly available, and some allow the definition of a preferred way to exchange information across firewalls. To avoid downloading every <Marie.Joe.xml> file on the P2P network and performing an off-line parsing of the files, the end-user device may use an online remote querying using SOAP protocols.

The end-user device narrows (at 145) the number of search results using one or more search criteria. In the example above, the search can be refined by querying/searching, for example, the <city> listed for the potential collaborator.

A search agent (called, e.g., NapGear) uses the <city> name to perform a SOAP action, <GetCity>, to all end-devices that published the <Marie.Joe.xml> file in the P2P network. Assuming they are turned on, each peer device will respond using a SOAP Response, for example, <CityResponse> (e.g., "New York"). If a peer device is turned off, a timeout will occur after an allotted time has passed.

As a result of a SOAP response (or timeout in case of no response) devices and/or files with non-appropriate responses are discarded from each device, for example, because "New York" doesn't fit to the requested location provided in the search form (i.e., "Los Angeles"). If additional search refinement is necessary, the search results may be further narrowed with additional Web service requests using additional search criteria.

Once an end-user has found one or more potential collaborators, it is appreciated, that the end-user may add the one or more potential collaborators to a directory on the end-user device. The directory may be implemented in any of a variety of ways, such as a buddy list, a chat list, a user group, etc. This step, although optional, allows the end-user to seek a known potential collaborator without performing the search step, as described in greater detail above, again. The directory may be informed by the P2P network of a potential collaborator's availability and may automatically update the potential collaborator's IP address.

The end-user device initiates (at 150) a collaboration session using any of a variety of collaboration applications (e.g., VoIP, online gaming application). The end-user device generally selects and initiates the particular collaboration application and the one or more potential collaborators follow suit. In one embodiment, the collaboration application is initiated on a direct P2P connection using a known IP address. For example, the end-user device may initiate VoIP software (e.g., SJPhone®) using an IP-address (for H.323) or an email address (for SIP). The IP address of the potential collaborator may be provided directly by the P2P network or the XML parsing process. This IP address is used as a command line parameter when starting the collaboration application on the end user's device. In an alternate embodiment, the collaboration application may be initiated remotely using Web services between the end-user device and the potential collaborator.

In the case of gaming applications, a similar procedure applies. Search criteria may be different and may not require knowledge of the potential collaborators. Search criteria for gaming applications may include, but is not limited to, "preferred gaming application" and "highest score." Such criteria may be sufficient to engage an online game or virtual competition between two or more known or unknown users.

The end-user device leaves (at 155) the hotspot area or any other IP access point or network access, and removes the posted files from the P2P network. If the end-user device cannot remove its identity from the P2P network, the P2P nodes can discard the user and his identity files after a determined period of time (i.e., a timeout).

Mobile devices can become part of the P2P server architecture themselves. For example, simple P2P servers may report to a "super peer" P2P server. This P2P architecture improves network robustness and enables faster searches. Super peers are well known to those skilled in the art and are extensively used in popular P2P networks.

Figure 8:
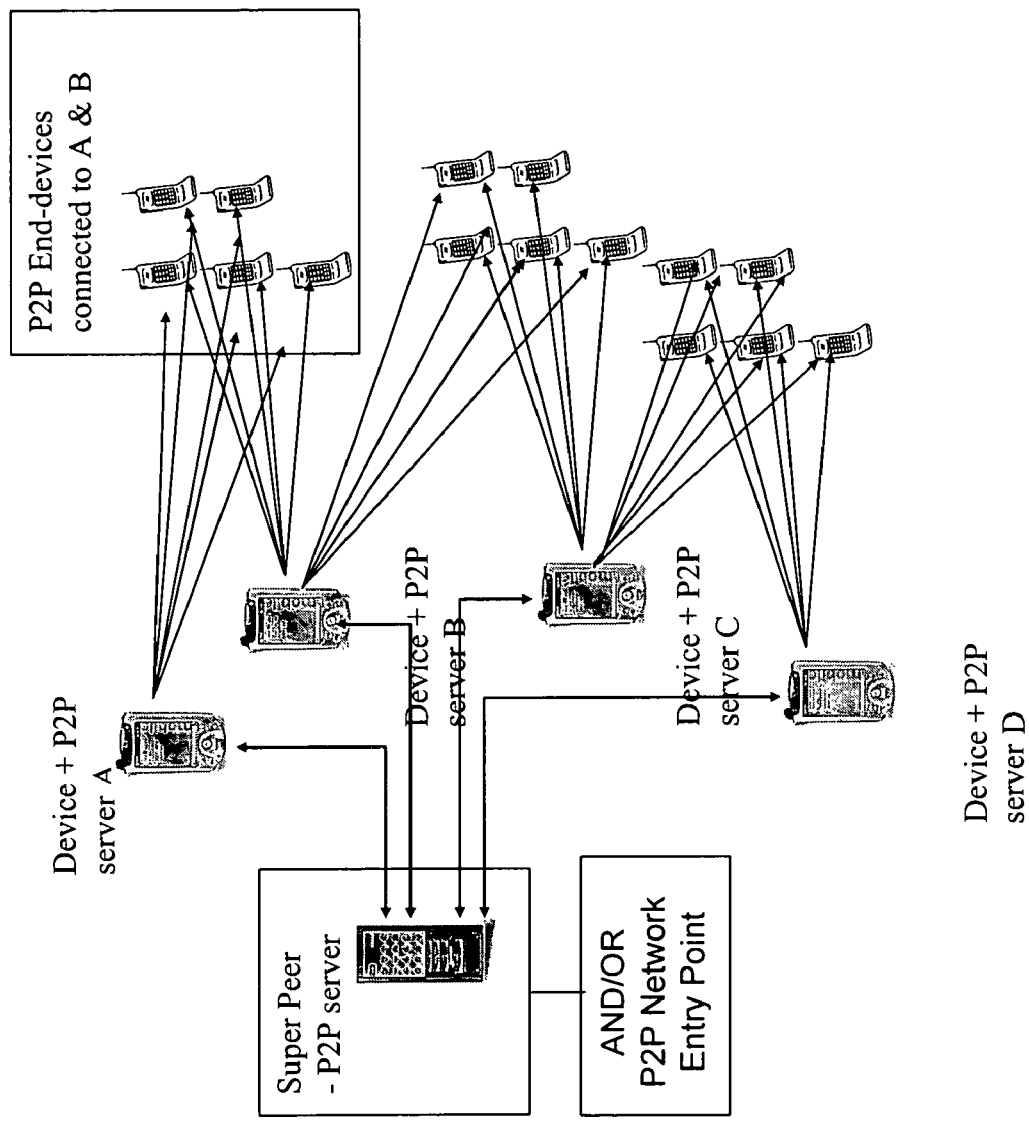
FIG. 8 depicts a diagram illustrating connectivity between a super peer P2P network and/or a P2P entry point, in accordance with one illustrative embodiment of the present invention.

FIG. 8 illustrates how simple mobile devices connect to mobile P2P servers, which, in turn, can connect to a super peer P2P server and/or a P2P network entry point, in accordance with one embodiment of the present invention. In this example, even if two simple end-user devices are not connected together, they can discover each other using a simple request to the super peer. By letting simple end-user devices connect to two or more P2P embedded servers, we greatly improve the network redundancy. As shown in FIG. 7, if server A fails (e.g., looses its wireless connection, all devices connected can be reached by server B which is still connected to the super peer server.

It should be understood that the forgoing description of the present invention should not be limited to "end-user" or personal devices. For example, we can also utilize any of a variety machines connected to a P2P network, such that the machines are capable of performing automatic searches. Machines can perform searches by (a) manually gathering information from an operator, or (b) automatically gathering information in real-time (e.g., a captured measurement unit like temperature or pressure).

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A system for discovering potential collaborators on a peer-to peer (P2P) network, comprising:
    a plurality of potential collaborators; and
    a seeker device;
    wherein the seeker device registers with the P2P network;
    wherein the seeker device initiates a Web service to a Web service provider;
    wherein the seeker device requests an available P2P server on the P2P network from the Web service provider using the Web service;
    wherein the seeker device registers the available P2P server in a Web service cluster using the Web service;
    wherein the seeker device downloads a search form from the Web service provider to the seeker device, wherein the search form includes a plurality of search entry fields for identifying the potential collaborators;
    wherein data is manually entered into at least one of the search fields by a user of the seeker device;
    wherein the seeker device performs a search on the P2P network to determine identity files that include the manually entered data;
    wherein the seeker device determines the collaborators that correspond to the determined identity files; and
    wherein the seeker device initiates a voice over internet protocol (VOIP) session with the collaborators,
    wherein each identity file is an Extensible Markup Language (XML) file that is posted in a public directory that is accessible using a P2P protocol, and
    wherein at least one of the identity files includes a first tag identifying a corresponding one of the potential collaborators and a second tag including information for a VOIP process of the corresponding one of the collaborators to enable the VOIP session between the seeker device and the collaborators.

2. The system of claim 1, wherein the seeker device is a seeker end-user device and the plurality of potential collaborators are a plurality of potential end-user devices.

3. The system of claim 2, wherein the seeker end-user device and each of the plurality of potential end-user devices comprises at least one of a personal digital assistant, a laptop, and a cellular phone.

4. The system of claim 1, wherein the at least one identity file of the plurality of potential collaborators is downloaded from the Web service provider in response to the seeker device sending a Web service request to the Web service provider.

5. The system of claim 2, wherein the seeker end-user device logs on a Web service provider to gain access to the P2P network using Web services and simple-object access protocols (SOAP) over hypertext transfer protocol (HTTP) and internet protocol (IP) networks.

6. The system of claim 1, wherein the seeker device is a machine connected to an IP network.

7. The system of claim 1, wherein the P2P network comprises at least one of Kazaa, OpenNAP, Gnutella, FastTrack, LimeWire, eMule/Kademlia, and Napster.

8. The system of claim 1, wherein the session is independent of the P2P network.

9. A method for a seeker device discovering potential collaborators on a peer-to peer (P2P) network, comprising:
  discovering one or more entry point nodes to the P2P network;
  registering the seeker device with the P2P network;
  initiating a Web service to a Web service provider;
  requesting an available P2P server on the P2P network from the Web service provider using the Web service;
  registering the available P2P server in a Web service cluster using the Web service;
  downloading a search form from the Web service provider to the seeker device, wherein the search form includes a plurality of search entry fields for identifying the potential collaborators;
  manually entering data into at least one of the search fields by a user of the seeker device;
  performing a search by the seeker device on the P2P network to determine identity files that include the manually entered data;
  determining the collaborators that correspond to the determined identity files; and
  initiating a voice over internet protocol (VOIP) session with the collaborators,
    wherein each identity file is an Extensible Markup Language (XML) file that is posted in a public directory that is accessible using a P2P protocol, and
    wherein at least one of the identity file files includes a first tag identifying a corresponding one of the potential collaborators and a second tag including information for a VOIP process of the corresponding one of the collaborators to enable the VOIP session between the seeker device and the collaborators.

10. The method of claim 9, further comprising performing identity provisioning.

11. The method of claim 9, further comprising obtaining service and identity availability for a result of the search.

12. The method of claim 9, further comprising narrowing the search by searching only the identity files whose filenames include data for at least one of the search fields.

13. The method of claim 9, wherein discovering one or more entry point nodes to the P2P network comprises:
  querying a Web service running on a Web service cluster;
  receiving an identity form from a Web service provider in response to a Web service request, the identity form comprises a plurality of information fields;
  populating one or more of the plurality of information fields; and
  posting the identity form on the P2P network.

14. A method for a seeker device to discover potential collaborators on a peer-to peer (P2P) network, comprising:
  registering the seeker device with the P2P network;
  initiating a Web service to a Web service provider;
  requesting an available P2P server on the P2P network from the Web service provider using the Web service;
  registering the available P2P server in a Web service cluster using the Web service;
  downloading a search form from the Web service provider to the seeker device, wherein the search form includes a plurality of search entry fields for identifying the potential collaborators;
  manually entering data into at least one of the search fields by a user of the seeker device;
  performing a search by the seeker device on the P2P network to determine identity files that include the manually entered data;
  determining the collaborators that correspond to the determined identity files; and
  initiating a voice over internet protocol (VOIP) session with the collaborators,
    wherein each identity file is an Extensible Markup Language (XML) file that is posted in a public directory that is accessible using a P2P protocol, and
    wherein at least one of the identity file files includes a first tag identifying a corresponding one of the potential collaborators and a second tag including information for a VOIP process of the corresponding one of the collaborators to enable the VOIP session between the seeker device and the collaborators.

15. The method of claim 14, wherein registering with a P2P network comprises registering automatically with the P2P network when the seeker device connects to an IP network.

16. The method of claim 14, wherein initiating a Web service to a Web service provider comprises initiating a Web service to a Web service provider using HTTP/XML/SOAP protocols.

17. The method of claim 14, further comprising discovering the Web service provider using a UDDI Web service registry and business entities.

18. The method of claim 14, wherein requesting an available P2P server on the P2P network from the Web service provider using the Web service comprises sending a Web service request using a Web service to the Web service provider, the Web service request requesting a list of available P2P servers.

19. The method of claim 18, wherein sending a Web service request using a Web service to the Web service provider comprises sending a Web service request defined in a WSDL service descriptor file using a Web service to the Web service provider.

20. The method of claim 14, further comprising performing identity self-provisioning on the P2P network by:
  receiving an identity form from the Web service provider in response to a Web service request, the identity form comprises a plurality of information fields;

populating one or more of the plurality of information fields; and posting the identity form on the P2P network.

21. The method of claim 14, wherein the session is independent of the P2P network.

22. A machine-readable medium having instructions stored thereon for execution by a processor to perform a method for a seeker device to discover potential collaborators on a peer-to peer (P2P) network, comprising:

registering the seeker device with the P2P network;

initiating a Web service to a Web service provider;

requesting an available P2P server on the P2P network from the Web service provider using the Web service;

registering the available P2P server in a Web service cluster using the Web service;

downloading a search form from the Web service provider to the seeker device, wherein the search form includes a plurality of search entry fields for identifying the potential collaborators;

manually entering data into at least one of the search fields by a user of the seeker device;

performing a search by the seeker device on the P2P network to determine identity files that include the manually entered data;

determining the collaborators that correspond to the determined identity files; and initiating a voice over internet protocol (VOW) session with the collaborators, wherein each identity file is an Extensible Markup Language (XML) file that is posted in a public directory that is accessible using a P2P protocol, and wherein at least one of the identity files includes a first tag identifying a corresponding one of the potential collaborators and a second tag including information for a VOIP process of the corresponding one of the collaborators to enable the VOIP session between the seeker device and the collaborators.

23. The method of claim 9, wherein each identity file is stored as one of an XML file on a P2P shared directory on a potential collaborator or on a distributed Hash Table on the P2P network.

* * * * *